United States Patent
Ashcraft et al.

(10) Patent No.: US 9,778,694 B2
(45) Date of Patent: Oct. 3, 2017

(54) DOCKING SYSTEM

(71) Applicant: HEWLETT-PACKARD DEVELOPMENT COMPANY, L.P., Houston, TX (US)

(72) Inventors: Britt C. Ashcraft, Tomball, TX (US); Eric Chen, Houston, TX (US); Craig T. Brown, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/227,802

(22) Filed: Aug. 3, 2016

(65) Prior Publication Data

US 2016/0342178 A1    Nov. 24, 2016

Related U.S. Application Data

(63) Continuation of application No. 15/078,791, filed on Mar. 23, 2016, now Pat. No. 9,442,528, which is a continuation of application No. 15/004,126, filed on Jan. 22, 2016, now Pat. No. 9,329,634, which is a continuation of application No. 14/344,411, filed as application No. PCT/US2011/052046 on Sep. 16, 2011, now Pat. No. 9,274,558.

(51) Int. Cl.
| | |
|---|---|
| *G06F 1/16* | (2006.01) |
| *G06F 13/00* | (2006.01) |
| *G06F 13/40* | (2006.01) |
| *H01R 13/44* | (2006.01) |
| *H01R 43/26* | (2006.01) |

(52) U.S. Cl.
CPC ........ *G06F 1/1632* (2013.01); *G06F 13/4081* (2013.01); *H01R 13/44* (2013.01); *H01R 43/26* (2013.01); *Y10T 29/49208* (2015.01)

(58) Field of Classification Search
CPC ..................................... G06F 1/1632
USPC ................. 361/679.4–679.45; 710/303, 304
See application file for complete search history.

(56) References Cited

U.S. PATENT DOCUMENTS

| | | | |
|---|---|---|---|
| 5,704,212 A | * | 1/1998 | Erler ...................... F25B 21/04 361/679.41 |
| 6,093,039 A | | 7/2000 | Lord |

(Continued)

FOREIGN PATENT DOCUMENTS

CN    1521590    8/2004

OTHER PUBLICATIONS

International Search Report and Written Opinion, in PCT Application No. PCT/US2011/052046, dated Apr. 16, 2012, 8 pgs.

(Continued)

*Primary Examiner* — Nidhi Thaker
(74) *Attorney, Agent, or Firm* — HP Patent Department

(57) ABSTRACT

In some examples, a docking system includes a base, a deck having an upper surface to contact a computing device resting upon the deck, wherein the deck includes apertures therethrough, and projections extending upwardly from a surface of the base. The docking system further includes resilient bias elements to bias the deck at a raised position at which the upper surface of the deck extends at or above a height of each of the projections, where the deck is linearly movable from the raised position to a lowered position at which the projections extend through the apertures, the deck being linearly movable without being pivotably coupled to the base.

16 Claims, 3 Drawing Sheets

(56) References Cited

U.S. PATENT DOCUMENTS

| | | | | |
|---|---|---|---|---|
| 6,115,247 | A * | 9/2000 | Helot | G06F 1/1632 312/223.1 |
| 6,135,801 | A | 10/2000 | Helot | |
| 6,264,488 | B1 | 7/2001 | Helot et al. | |
| 6,301,106 | B1 * | 10/2001 | Helot | G06F 1/1632 320/107 |
| 6,560,100 | B1 | 5/2003 | Shin | |
| 6,667,881 | B2 | 12/2003 | Oross | |
| 6,798,647 | B2 * | 9/2004 | Dickie | G06F 1/1616 345/158 |
| 6,813,145 | B2 | 11/2004 | DeLuga | |
| 7,256,990 | B2 | 8/2007 | Grunow et al. | |
| 7,405,929 | B1 | 7/2008 | Chuang | |
| 2003/0041206 | A1 | 2/2003 | Dickie | |
| 2006/0236015 | A1 | 10/2006 | Tsuji | |
| 2006/0250764 | A1 * | 11/2006 | Howarth | G06F 1/1632 361/679.41 |
| 2008/0054769 | A1 | 3/2008 | Ling | |
| 2010/0265652 | A1 * | 10/2010 | Agata | G06F 1/1632 361/679.41 |
| 2013/0050932 | A1 * | 2/2013 | Williams | G06F 1/1632 361/679.41 |

OTHER PUBLICATIONS

The International Bureau of WIPO, International Preliminary Report on Patentability for PCT/US2011/052046 dated Mar. 27, 2014 (5 pages).

* cited by examiner

DOCKING SYSTEM

CROSS REFERENCE TO RELATED APPLICATIONS

This is a continuation of U.S. application Ser. No. 15/078,791, filed Mar. 23, 2016, which is a continuation of U.S. application Ser. No. 15/004,126, filed Jan. 22, 2016, now U.S. Pat. No. 9,329,634, which is a continuation of U.S. application Ser. No. 14/344,411, filed Mar. 12, 2014, now U.S. Pat. No. 9,274,558, which is a national stage application under 35 U.S.C. §371 of PCT/US2011/052046, filed Sep. 16, 2011, which are all hereby incorporated by reference in their entirety.

BACKGROUND

Portable computing devices are sometimes connected to other devices or a power supply using a dock. Existing docks include multiple protruding connectors which are exposed when the dock is not being used.

DETAILED DESCRIPTION OF THE EXAMPLE EMBODIMENTS

Figure 1:
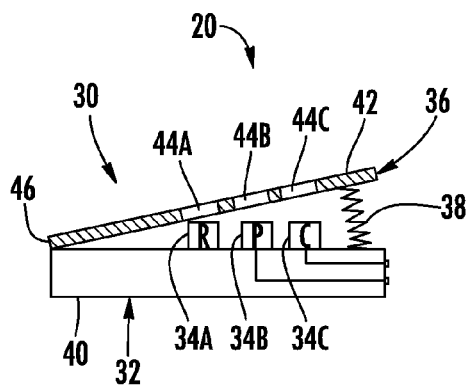
FIG. 1 is a sectional view schematically illustrating a first example dock with a deck in a raised position.
Figure 2:
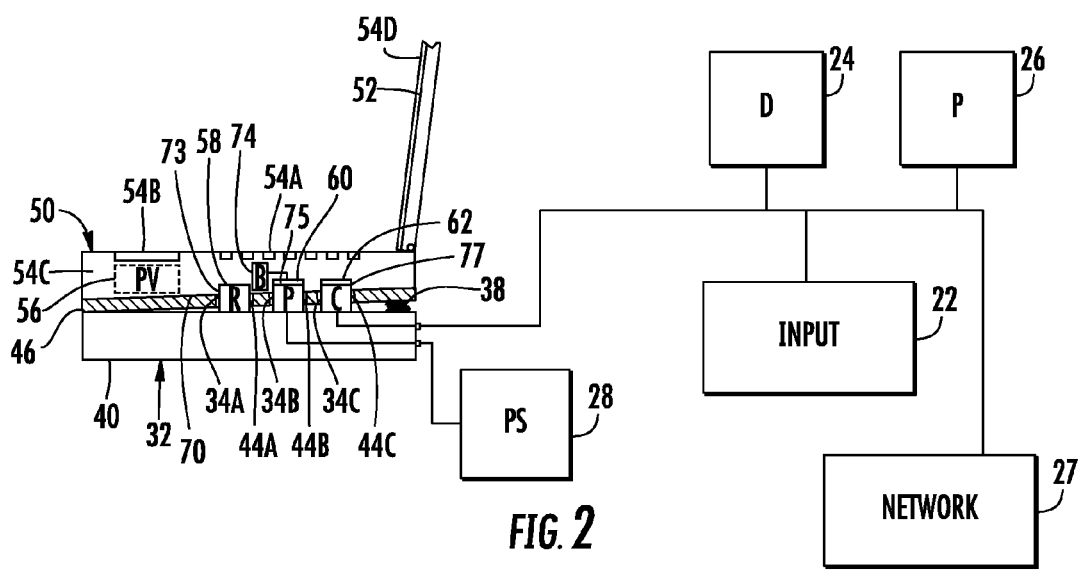
FIG. 2 is a sectional view schematically illustrating the first example dock provided as part of a larger portable computing device docking system with the dock deck in a lowered position and supporting a portable computing device.

FIG. 1 schematically illustrates an example of a portable computing device dock 30. As will be described hereafter, dock 30 facilitates connection of a portable computing device without exposed and protruding connectors which would otherwise be susceptible to damage or undesirably catching upon objects. FIG. 2 schematically illustrates dock 30 connected to a portable computing device 50 and incorporated as part of a larger docking system 20. In addition to dock 30, docking system 20 comprises input 22, display 24, printer 26, network 27 and power supply 28.

Input 22 comprises one or more input devices for facilitating entry of commands or instructions to portable computing device 50. Examples of input devices include, but are not limited to, a full-size keyboard, a mouse, a touchpad and the like.

Display 24 comprise a screen, monitor, projector whether device configured to visually display content transmitted from the portable computing device docked at dock 30. Printer 26 comprises a printing device configured to print out content received from the portable computing device docked at dock 30 onto a print media, such as photo paper, stock paper or the like. Although the example illustrates peripherals 24 and 26 connected directly dock 30, in other examples, peripherals such as printer 26 may alternatively be indirectly connected to dock 30, such as through network 27.

Network 27 comprises a network connection such as an Internet connection or an Internet connection. Network 27 facilitates a wired connection to dock 30 into the portable computing device 50. In other examples, network 27 may be omitted, wherein the portable computing device 50 connects to a network in a wireless fashion. In some examples, dock 30 may include a wireless network card or device, providing wireless connectivity to portable computing device 50 when portable computing device 50 is docked at dock 30.

Power supply 28 comprises a source of electrical power connected to dock 30 so as to power the portable computing device dock to dock 30 while on dock 30 or so as to charge a battery carried by the portable computing device docked on dock 30. In one embodiment, power supply 28 may be embodied as part of computing system 22.

Dock 30 comprises a structure upon which a portable computing device may rest, wherein the dock connects with the portable computing device. Dock 30 comprises base 32 projections 34A, 34B and 34C (collectively referred to as projections 34), deck 36 and bias 38. Base 32 serves as a foundation for dock 30. Base 32 comprises a housing 40 enclosing electrical wiring or traces extending from projections 34 to external ports are external leads extending from base 32. Although schematically illustrated as rectangular, base 32 may have other shapes and configurations.

Projections 34 protrude upwardly from base 32 for connection with a portable computing device resting upon dock 30. Projection 34A comprises one or more retainers configured to secure a portable computing device in place relative to dock 30. In one embodiment, projection 34A comprise a latch or hook which is configured to catch up on a corresponding latch or hook receiving ring of the portable computing device. In other examples, projection 34A may have other configurations or may be omitted.

Projection 34B comprises one or more electrical connections, such as a pad, socket or electrical plug protruding from base 32 and configured make electrical connection with a corresponding pad, plug or socket of the portable computing device. Projection 34B facilitates electrical connection of the portable computing device upon dock 30 to power supply 28. Although illustrated as distinct from projection 34A or 34C, in other examples, projection 34B may be incorporated as part of projection 34A or 34C for facilitating electrical connection to power supply 28. In some examples, projection 34A may be omitted.

Projection 34C comprises one or more electrical connections, such as a pad, socket or electrical plug protruding from base 32 and configured to make electrical connection with a corresponding pad, plug or socket of the portable computing device resting upon dock 30. Projection 34C facilitates electrical connection with the portable computing device for the transmission of electrical signals representing information or data being transferred to and being transferred from the portable computing device resting upon dock 30. Although illustrated as distinct from projection 34A or 34B, in other examples, projection 34C may be incorporated as part of projection 34A or 34B for facilitating electrical connection to power supply 28. In some examples, projection 34C may be omitted.

Deck 36 comprises a pad, a landing, panel, platform, cover or other structure having an upper surface 42 and apertures 44A, 44B and 44C (collectively referred to as apertures 44). Surface 42 of deck 36 bases generally upwardly and is configured to contact a lower surface of the portable computing device resting upon surface 42. In the example illustrated, surface 42 is substantially planar or flat. In one example, the entirety of surface 42 is flat, omitting any posts, bars or catches which might interact with and catch upon external objects when deck 30 is being transported.

Apertures 44 comprise holes or openings extending from surface 42 through deck 36. Apertures 44 are in substantial alignment with projections 34 and are located, sized and shaped to receive corresponding projections 34 upon movement of deck 36. In the example shown, apertures 34 are configured to permit corresponding projections 34 to pass through corresponding apertures 34. In particular, apertures 44A, 44B and 44C are aligned with and configured to at least receive projections 34A, 34B and 34C, respectively.

Deck 36 is coupled to base 32 so as to be movable between a raised position shown in FIG. 1 and a lowered position shown in FIG. 2. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. In the example shown, deck 36 is pivotably coupled or hinged to base 32 for pivotal movement about axis 46. In other examples, deck 36 may be movably coupled to base 32 in other fashions.

Bias 38 comprises one or more structures configured to resiliently urge or bias deck 36 towards the raised position shown in FIG. 1 in which deck 36 extends over or above projection 34. According one example, bias 38 comprises a compression spring captured between deck 36 and base 32. In another example, bias 38 may comprise a leaf spring captured between deck 36 and base 32. In yet other embodiments, bias 38 may have other configurations.

FIGS. 1 and 2 illustrate operation of dock 30. FIG. 2 illustrates dock 30 receiving or docking an example portable computing device 50. Portable computing device 50 comprises a portable electronic device configured to be manually carried or transported. Portable computing device 50 generally includes a display in some form of input. Examples of portable computing device 50 include, but are not limited to, laptop computers, personal data assistants (PDA's), smart phones, digital cameras, portable media players and the like.

In the example illustrated, portable computing device 50 comprises a self-contained unit which includes display 52, inputs 54A, 54B, 54C, 54D (collectively referred to as inputs 54), processing unit 56, retainer interface 58, power interface 60 and communication interface 62. Display 52 comprises a screen or monitor carried by device 50 for displaying content. In the example shown, display 52 is provided as part of a pivotable screen. In other examples, screen 52 may be stationary and may extend in the same general plane as inputs 54A.

Inputs 54 facilitates input of commands or data to device 50. In the example shown, input 54A comprise a keyboard. Input 54B comprises a touchpad. Input 54C comprises a communications port such as a USB port or a microphone port. Input 54D comprises a video camera. In other examples, device 50 may have other forms of inputs or outputs.

Processing unit 56 comprises one or more processing units configured to receive inputs or commands via input 54, to store content or data in an associated memory and/or to generate control signals directing the operation of display 52 or other output devices. Processing unit 56 is further configured to generate commands to facilitate communication with computing system 22, display 24 and printer 26 when device 50 is docked at dock 30.

For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Unless otherwise specifically noted, the controller is not limited to any specific combination of hardware circuitry and software, nor to any particular source for the instructions executed by the processing unit.

Retainer interface 58 comprises a structure or mechanism configured to interact with retainer 34A of dock 30 such that computing device 50 is releasably retained in place upon dock 30. Retainer interface 58 extends up on a bottom or lower surface 70 of computing device 50. In the example illustrated, retainer interface 58 comprises an upwardly extending cavity, detent or recess 73 configured to receive retainer 34A.

Power interface 60 comprises a structure or mechanism configured to electrically connect to projection 34B of dock 30 when portable computing device 50 is docked at dock 30. Depending upon the configuration of projection 34B, power interface 60 may comprise a pad, electrical socket or electrical plug. According to one example, power interface 60 is electrically connect to a battery 74 of portable computing device 50, wherein interface 60 facilitates the charging of the battery 74. In the example illustrated, power interface 60 resides in a cavity, detent or recess 75 that receives projection 34B when portable computing device 50 is resting upon deck 36.

Communication interface 62 comprises a structure or mechanism configured to electrically connect to projection 34C of dock 30 when portable computing device 50 is docked at dock 30. Depending upon the configuration of projection 34C, communication interface 62 may comprise a pad, electrical socket or electrical plug. Communication interface 62 is electrically connected to a circuit board (not shown) and to processing unit 56. Communication interface 62 facilitate the transmission of signals representing data for manipulation, storage in a memory or presentation by display 52 by processing unit 56. In the example illustrated, communication interface 62 resides in a cavity, detent or recess 77 that receives projection 34c when portable computing device 50 is resting upon deck 36.

As shown by FIG. 1, in the raised position, surface 42 extends above or at a height above each of projections 34. Because surface 42 of deck 36 omits projections or protuberances, surface 42 is substantially flat. As a result, surface 42 does not include any structures that may undesirably catch or snag on other objects. At the same time, projections 34 are substantially concealed. In one example, deck 36 may include downwardly hanging side walls or a skirt that overlaps sides of base 32 to additionally conceal projections 34 from the side, front and rear.

As shown by FIG. 2, when surface 42 is lowered against bias 38, projections 34 protrude through apertures 44 for connection to portable computing device 50. In particular, projections 34 projects through apertures 44 into cavities 73, 75 and 77 on the bottom 70 of computing device 50, whereby projection 34A secures computing device 50 in place, projection 34B facilitate power transmission to computing device 50 and projection 34C facilitates content or data transmission between computing device 50 and one or more main computing systems or peripherals connected to dock 30.

In the example illustrated, bias 38 is provided with a spring constant such that deck 36 moves from the raised position shown in FIG. 1 to the lowered position shown in FIG. 2 solely in response to the weight of portable computing device 50 bearing upon deck 36. In another example, bring 38 may be provided with a spring constant or may have biasing force such that the weight alone of computing device 50 is insufficient to move deck 36 against bias 38 to the lowered position. In such an example, additional manual force of the added to lower deck 36. In such an example, projection 34A, comprising a retainer, may retain computing device 50 and deck 36 in the lowered position until released.

Figure 3:
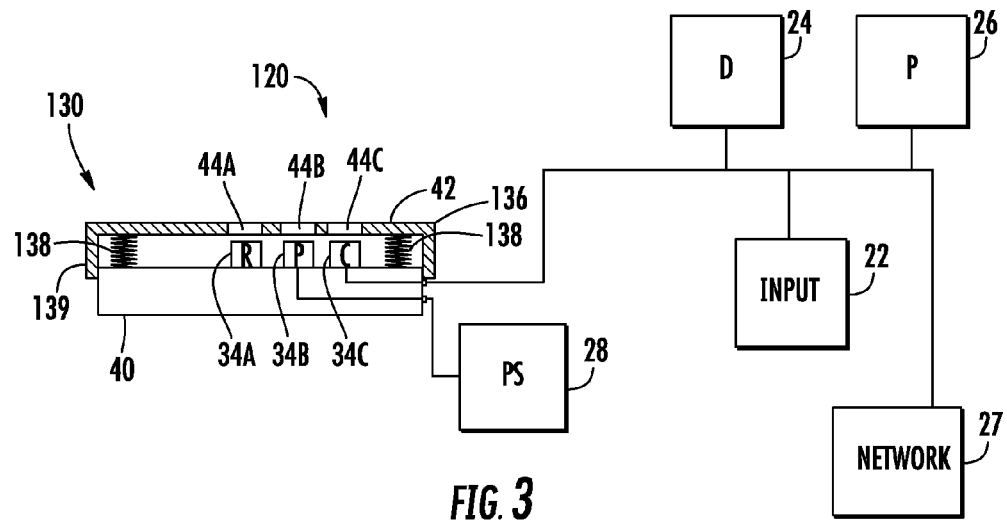
FIG. 3 is a sectional view schematically illustrating a second example portable computing device docking system with a dock deck in a raised position.
Figure 4:
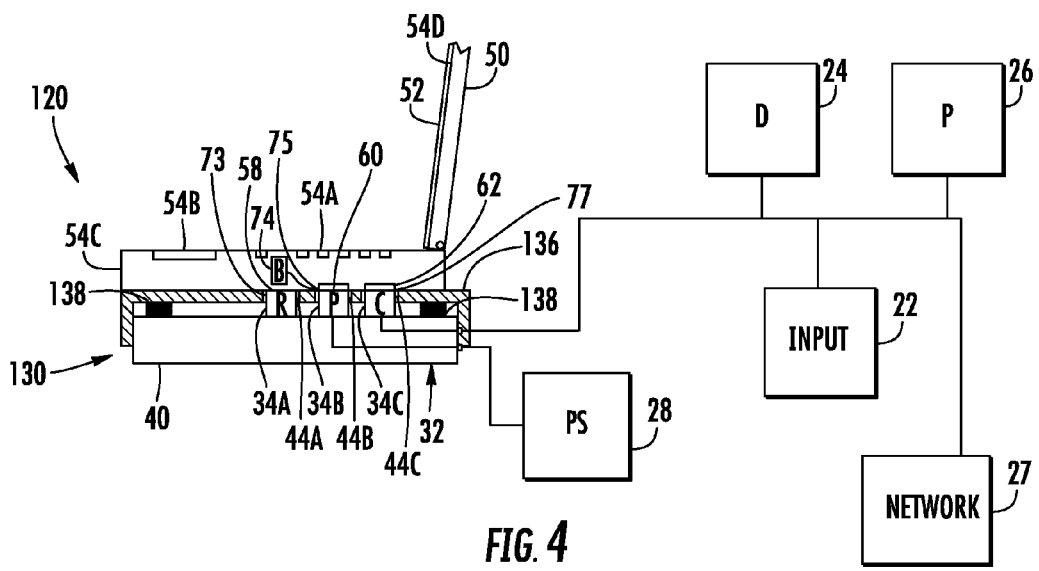
FIG. 4 is a sectional view schematically illustrating the second example portable computing device docking system with the dock deck in a lowered position and supporting a portable computing device.

FIGS. 3 and 4 schematically illustrate docking system 120, another example of docking system 20. Docking system 120 is similar to docking system 20 except that docking system 120 includes deck 136 and bias 138 in place of deck 36 and bias 38, respectively. Those remaining components of docking system 120 which correspond to components of docking system 20 are numbered similarly.

Deck 136 is itself similar to deck 36 except that deck 136 is not pivotably coupled or hinged to base 32, but is instead floats, under the support of biases 138, above projections 34. Instead of pivoting about an axis to move deck 136 between a raised position (shown in FIG. 3) and a lowered position (shown FIG. 4, deck 136 linearly moves or translates upward and downward against bias 138. Because deck 136 floats, surface 42 of deck 136 has substantially the same orientation when raised as when lowered. In the example shown, surface 42 of deck 136 has a substantially horizontal orientation in both the raised position and the lowered position. In other examples, surface 42 may have other orientations and may be inclined or declined in both the raised position and the lowered position. In the example shown, deck 136 includes a side skirt 139 which extends downwardly from surface 42 and along all sides of deck 136 to further conceal projections 34 when deck 136 is in the raised position.

Bias 138 comprises one or more springs or other biasing mechanisms captured between base 32 and deck 136 and appropriate located so as to elevate and support surface 42 above projections 34 in a default or resting state. In one example, bias 138 comprises a plurality of appropriately spaced compression springs. In other examples, bias 138 may comprise other by structures, such as leaf springs and the like.

As shown by FIG. 4, positioning of computing device 50 upon surface 42 of deck 136 results in springs 138 being compressed and results in deck 136 moving to the lowered position. In the lowered position, projection 34A projects through aperture 44A to contact and engage retainer interface 58 within cavity 73 to secure and retain computing device 50 with respect to dock 130. At the same time, projection 34B projects through aperture 44B into contact and engagement with power interface 60 within cavity 75 to facilitate the transmission of power to computing device 50. Projection 34C projects through aperture 44C into contact and engagement with communication interface 62 within cavity 77 to facilitate transmission of data via dock 30.

Figure 5:
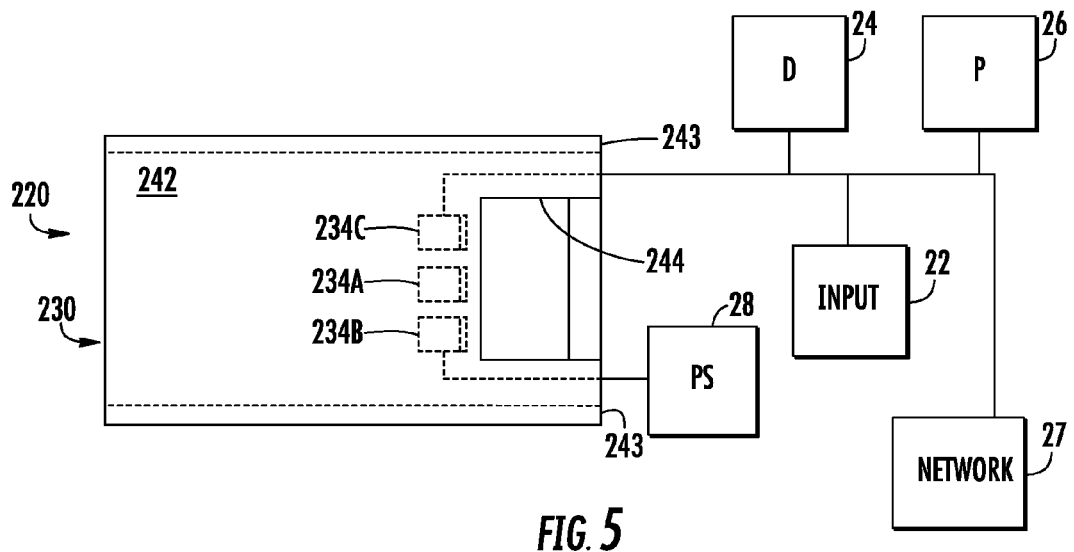
FIG. 5 is a top plan view schematically illustrating a third example portable computing device docking system with a dock deck in a raised position.
Figure 6:
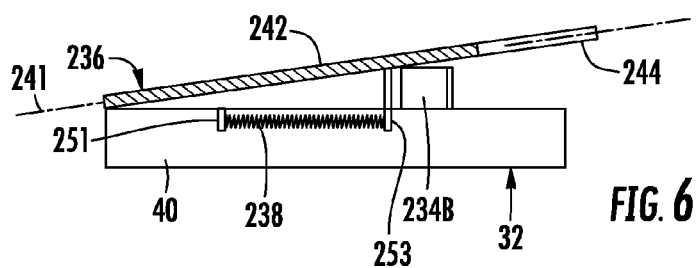
FIG. 6 is a sectional view schematically illustrating the third example portable computing device docking system with a dock deck in a raised position.
Figure 7:
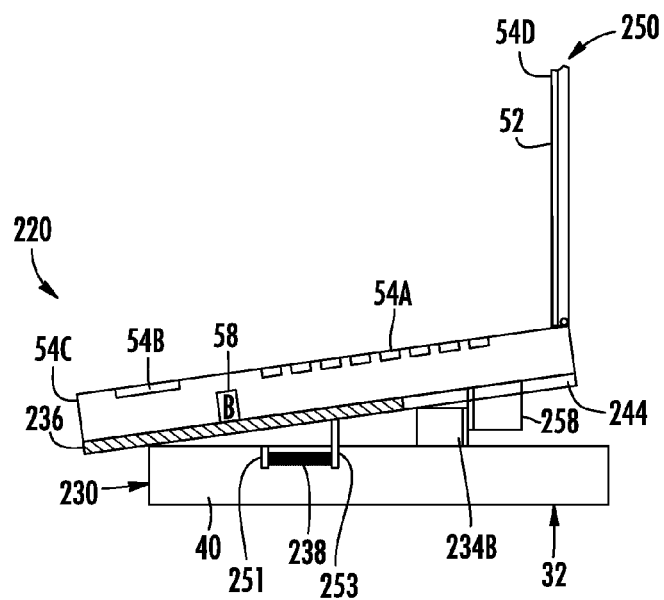
FIG. 7 is a sectional view schematically illustrating the third example portable computing device docking system with the dock deck in a lowered position and supporting a portable computing device.

FIGS. 5-7 schematically illustrate docking system 220, another example of docking system 20. Docking system 220 is similar to docking system 20 except that docking system 220 comprises includes dock 230 for use with portable computing device 250 (shown in FIG. 7) in place of dock 30. Those remaining components of docking system 220 which correspond to components of docking system 20 are numbered similarly.

Dock 230 is similar to dock 30 except that dock 230 includes projections 234A, 234B and 234C (collectively referred to as projections 234), deck 236 and bias 238 in place of projections 34, deck 36 and bias 38, respectively. Projections 234 are similar to projections 34 in function. Like projections 34A, 34B and 34C, projections 234A, 234B and 234C facilitate retention, power and data communication, respectively, with a portable computing device. However, as shown by FIG. 7, projections 234 are configured to interact with or contact corresponding interfaces of portable computing device 250 in a sideways direction.

Deck 236 comprises a pad, panel, platform, cover or other structure having an upper surface 242 and aperture 244. Surface 242 of deck 236 bases generally upwardly and is configured to contact a lower surface of the portable computing device resting upon surface 242. In the example illustrated, surface 242 is substantially planar or flat. In one example, the entirety of surface 242 is flat, omitting any posts, bars or catches which might interact with and catch upon external objects when deck 230 is being transported.

Aperture 244 comprise a hole or opening extending from surface 242 through deck 236. Aperture 44 extends forwardly projections 234 and is located, sized and shaped to receive projections 234 upon movement of deck 236.

Deck 236 is coupled to base 32 so as to be movable between a raised position shown in FIGS. 5 and 6 and a lowered position shown in FIG. 7. In the example shown, deck 236 is slidably supported for movement along and within a plane 241 by a pair of opposing guides 243. Guides 243 may comprise inwardly facing grooves or channels receiving corresponding outwardly projecting tongues or tabs extending from deck 236. In other examples, deck 236 may be provided with such channels, whereas base 32 includes tongues or tabs that slide within such channels. In other examples, deck 236 may be slidably supported for movement along the incline in other fashions.

Bias 238 comprises one or more structures configured to resiliently urge or bias deck 236 towards the raised position shown in FIG. 6 in which deck 236 extends over or above projection 234. According one example, bias 238 comprises a compression spring captured between deck 236 and base 32. In the example shown, bias 238 is captured between structure 251 of base 32 and structure 253 of deck 236. In another example, bias 38 may comprise a leaf spring captured between deck 36 and base 32. In yet other embodiments, bias 238 may have other configurations.

As shown by FIGS. 5 and 6, in the raised position, surface 242 extends above or at a height above each of projections 234. Because surface 242 of deck 236 omits projections or protuberances, surface 242 is substantially flat. As a result, surface 242 does not include any structures that may undesirably catch or snag on other objects. At the same time, projections 234 are substantially concealed. In one example, deck 236 may include downwardly hanging side walls or a skirt that overlaps side to base 32 to additionally conceal projections 34 from the side, front and rear.

As shown by FIG. 7, when surface 242 is lowered against bias 238, projections 234 become exposed by movement of aperture 244 for connection to portable computing device 250. In particular, as the weight of computing device 250 bears down upon deck 236, deck 236 slides downward along guides 243 within plane 241, compressing bias 238, until aperture 244 overlies projections 234, exposing projections 234 to permit retention, powering communication interfaces of portable computing device 250 to contact and engage projections 234 of dock 230. As deck 236 slides down the ramp provided by guides 243, portable computing device 250 resting upon deck 236 also slides downward and to the left as seen in FIG. 6. As shown by FIG. 7, this downward sliding of deck 236 and portable computing device 250 occurs until the retention, power and communication interfaces 258 projecting downwardly from portable computing device 250 makes sideways contact with projections 234.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A docking system comprising: a base; a deck having an upper surface to contact a computing device resting upon the deck, wherein the deck includes apertures therethrough; projections extending upwardly from a surface of the base, the projections comprising: a computing device connector projection having electrical contacts for electrically connecting the docking system to the computing device; and a computing device retainer projection configured to engage the computing device when resting upon the deck to retain the computing device relative to the deck; and resilient bias elements to bias the deck at a raised position at which the upper surface of the deck extends at or above a height of each of the projections, wherein the deck is linearly movable from the raised position to a lowered position at which the projections extend through the apertures, the deck being linearly movable without being pivotably coupled to the base, wherein the deck comprises a side skirt that covers an outer surface of the base when the deck is in the lowered position, such that the side skirt is outside the base, and the side skirt extends along all sides of the deck to conceal the projections when the deck is in the raised position.

2. The docking system of claim 1, wherein the side skirt covers the outer surface of the base when the deck is in the raised position.

3. The docking system of claim 1, wherein the upper surface of the deck has a same orientation in the raised position and the lowered position.

4. The docking system of claim 1, wherein a first resilient bias element of the bias elements is located proximate a rear of the base, and a second resilient bias element of the bias elements is located proximate a front of the base.

5. The docking system of claim 1, wherein the surface of the base from which the projections extend upwardly is an upper surface of the base.

6. The docking system of claim 1, wherein each of the resilient bias elements comprises a spring.

7. The docking system of claim 1, wherein the resilient bias elements cause the deck to float above the base with no pivotal coupling of the deck to the base.

8. The docking system of claim 1, wherein the upper surface of the deck omits any posts, bars, or catches carried by the deck and protruding above the upper surface.

9. The docking system of claim 1, wherein an entirety of the upper surface of the deck is flat.

10. A method of providing a docking system, comprising: providing a base; providing a deck having an upper surface to contact a computing device resting upon the deck, wherein the upper surface includes apertures therethrough; and extending projections upwardly from a surface of the base, the projections comprising: a computing device connector projection having electrical contacts for electrically connecting the docking system to the computing device; and a computing device retainer projection configured to engage the computing device when resting upon the deck to retain the computing device relative to the deck; supporting the deck using resilient bias elements to bias the deck at a raised position at which the upper surface of the deck extends at or above a height of each of the projections; arranging the deck to be linearly movable from the raised position to a lowered position at which the projections extend through the apertures, the deck being linearly movable without being pivotably coupled to the base; and providing a side skirt that extends downwardly from the deck, the side skirt covering an outer surface of the base when the deck is in the lowered position such that the side skirt is outside the base, and wherein the side skirt extends along all sides of the deck to conceal the projections when the deck is in the raised position.

11. The method of claim 10, wherein the side skirt covers the outer surface of the base when the deck is in the raised position.

12. The method of claim 10, wherein the upper surface of the deck has a same orientation in the raised position and the lowered position.

13. The method of claim 10, wherein a first resilient bias element of the bias elements is located proximate a rear of the base, and a second resilient bias element of the bias elements is located proximate a front of the base.

14. The method of claim 10, wherein each of the resilient bias elements comprises a spring.

15. The method of claim 10, wherein the upper surface of the deck omits any posts, bars, or catches carried by the deck and protruding above the upper surface.

16. The method of claim 10, wherein an entirety of the upper surface of the deck is flat.

* * * * *